United States Patent [19]

Shimizu

[11] Patent Number: 4,639,651
[45] Date of Patent: Jan. 27, 1987

[54] ELECTROMAGNETIC SERVO DEVICE

[75] Inventor: Yasuo Shimizu, Tochigi, Japan

[73] Assignee: Honda Giken Kogyo Kabushiki Kaisha, Tokyo, Japan

[21] Appl. No.: 791,641

[22] Filed: Oct. 25, 1985

[30] Foreign Application Priority Data

Oct. 26, 1984 [JP] Japan .................... 59-225456

[51] Int. Cl.⁴ ........................................ G05B 11/10
[52] U.S. Cl. ........................... 318/432; 318/489; 318/624; 180/6.28; 180/6.44
[58] Field of Search ............... 318/432, 433, 488, 624, 318/489; 310/92, 94; 180/6.28, 6.44, 6.48, 6.5, 79.1, 141, 142, 143

[56] References Cited

U.S. PATENT DOCUMENTS

| 2,754,465 | 7/1956 | Brier | 318/488 |
| 3,511,104 | 5/1970 | Piat | 180/79.1 X |
| 4,448,275 | 5/1984 | Kitagawa et al. | 180/142 X |
| 4,522,278 | 6/1985 | Kitagawa et al. | 180/142 X |
| 4,556,116 | 12/1985 | O'Neil | 180/142 X |

FOREIGN PATENT DOCUMENTS 59-11965  1/1984  Japan .................... 180/79.1

Primary Examiner—William M. Shoop, Jr.
Assistant Examiner—Bentsu Ro
Attorney, Agent, or Firm—Armstrong, Nikaido, Marmelstein & Kubovcik

[57] ABSTRACT

An electromagnetic servo device (200) includes a driving control circuit (100) adapted for, in accordance with an output signal (VR, VL) from a torque detection mechanism (11) for detecting steering torque (Ti) acting on an input shaft (1), providing a first control signal (Vmo), to thereby feed an armature current (Io) of a controlled quantity in a controlled direction, to an electric motor (18) for generating auxiliary torque to be applied to an output shaft (4) and a second control signal (Vcl), to thereby control, an electromagnetic clutch (41) for transmitting motor torque of the electric motor (18) as the auxiliary torque to the output shaft (4).

The second control signal (Vcl) has fed back thereto a signal (Vf) according to the actual quantity of the armature current (Io).

5 Claims, 11 Drawing Figures

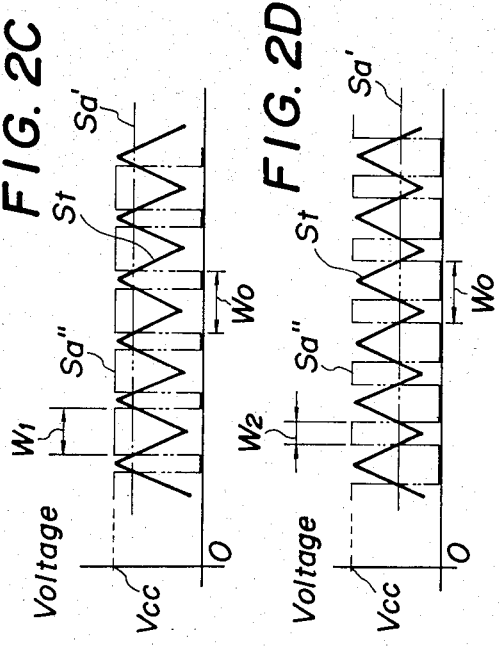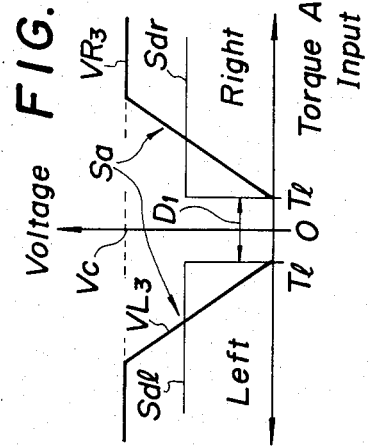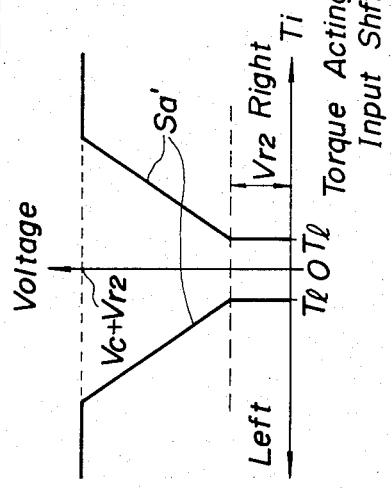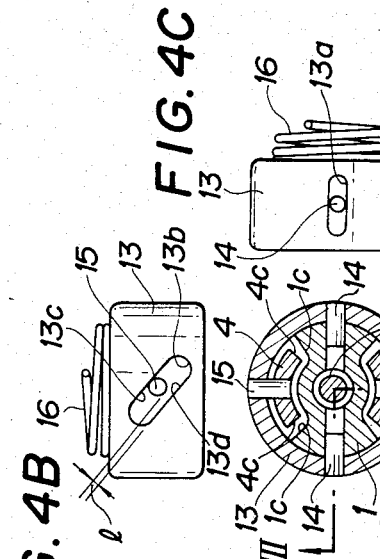

ELECTROMAGNETIC SERVO DEVICE

BACKGROUND OF THE INVENTION

1. Field of the Invention

The present invention generally relates to an electromagnetic servo device. More particularly, the invention relates to an electromagnetic servo device of a type suitable for use in an electric type power steering system for vehicles.

2. Description of Relevant Art

In view of problems on the hydraulic type power steering system such as that the structure thereof was complicated, recent years have proposed a variety of electric type power steering systems for vehicles. In those electric type power steering systems were employed various types of electromagnetic servo device.

Exemplarily, in Japanese Patent Application No. 59-192390, filed on Sept. 12, 1984, and its corresponding commonly assigned U.S. Pat. application Ser. No. 773,972 filed Sept. 5, 1985; there has been proposed by the present applicant an electromagnetic servo device for electric power steering systems for vehicles.

This electromagnetic servo device included an input shaft adapted to be operatively connected to a steering wheel, an output shaft adapted to be operatively connected to a road wheel to be turned, a torque detection mechanism for detecting the magnitude and the direction of torque acting on the input shaft, and a driving control circuit adapted to produce, based on a set of output signals from the torque detection mechanism, a torque magnitude signal and a torque direction signal and to feed, according to these signals, an electric motor, which was provided for supplying auxiliary torque to the output shaft, with an armature current of a necessary quantity, in a necessary direction of conduction. The electric motor was coaxially fitted around the output shaft, to be rotatable relative thereto, and adapted to have torque electromagnetically developed therein to be transmitted to the output shaft, through a reduction gearing and an electromagnetic clutch both fitted likewise around the output shaft.

The driving control circuit had generated, besides the armature current fed to the electric motor, which current was of the necessary quantity that was proportional to the torque magnitude signal, a drive signal for driving the electromagnetic clutch, the drive signal being obtained by overlapping the torque magnitude signal on the torque direction signal.

In other words, in this electromagnetic servo device, the electric motor was fed with an armature current in proportion to the magnitude of steering torque acting on the input shaft, and the electromagnetic clutch was driven to function with a clutching force in correspondence to the magnitude of the steering torque. Accordingly, with increase in the magnitude of the steering torque acting on the input shaft, the armature current to be fed the electric motor became large and also the clutching force of the electromagnetic clutch, that is, the function of torque transmission thereof, was intensified.

Incidentally, in this servo device, the torque magnitude signal, the torque direction signal, and the clutch drive signal had dead zones thereof with predetermined widths, respectively.

In this electromagnetic servo device, the torque developed at the electric motor was transmitted as auxiliary torque through the reduction gearing and the electromagnetic clutch in a smooth manner to the output shaft, whereby, for a driver of the vehicle, the burden that otherwise he or she had to bear when operating the steering wheel was adequately reduced, thus providing favorable steering characteristics.

However, such electromagnetic servo device had, in a driving control circuit thereof, a motor driving system and a clutch driving system respectively constituted as independent open loops relative to each other. There was thus found the desideratum to maintain a well matching state of clutching force with respect to motor torque.

In this respect, if the matching had been well controlled, such electromagnetic servo device could have rendered the steering characteristic of electric power steering system more favorable.

The present invention has been achieved to accomplish such desideratum in a conventional electromagnetic servo device.

SUMMARY OF THE INVENTION

According to the present invention, there is provided, in an electromagnetic servo device including an input shaft, an output shaft, an electric motor means for producing auxiliary torque to be applied to the output shaft, an electromagnetic clutch means for transmitting motor torque of the motor means as the auxiliary torque to the output shaft, a torque detection means for detecting steering torque acting on the input shaft, and a driving control circuit means adapted for, in accordance with an output signal from the torque detection means, providing a first control signal, to thereby feed an armature current of a controlled quantity in a controlled direction, to the motor means and a second control signal to, to thereby control, the clutch means, an improvement comprising the second control signal having fed back thereto a signal according to the actual quantity of the armature current.

Accordingly, an object of the present invention is to provide an electromagnetic servo device which is permitted, even at occasional occurrences of variation in the motor torque of an electric motor thereof and/or the clutching force of an electromagnetic clutch thereof, to have a matching state effectively maintained therebetween, thereby achieving smooth and stable transmission of auxiliary torque to an output shaft.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

FIGS. 2A to 2D are graphs showing characteristic curves of output signals from essential circuit elements of the driving control circuit of FIG. 1, respectively.

FIG. 4A is a sectional view, showing an essential part of a torque detection mechanism of the electromagnetic servo device, along line 4A —4A of FIG. 3.

FIGS. 4B and 4C are top and side views, showing a torque detecting mobile member, of the essential part of the torque detection mechanism of FIG. 4A, respectively.

DETAILED DESCRIPTION OF THE PREFERRED EMBODIMENT

Figure 1:
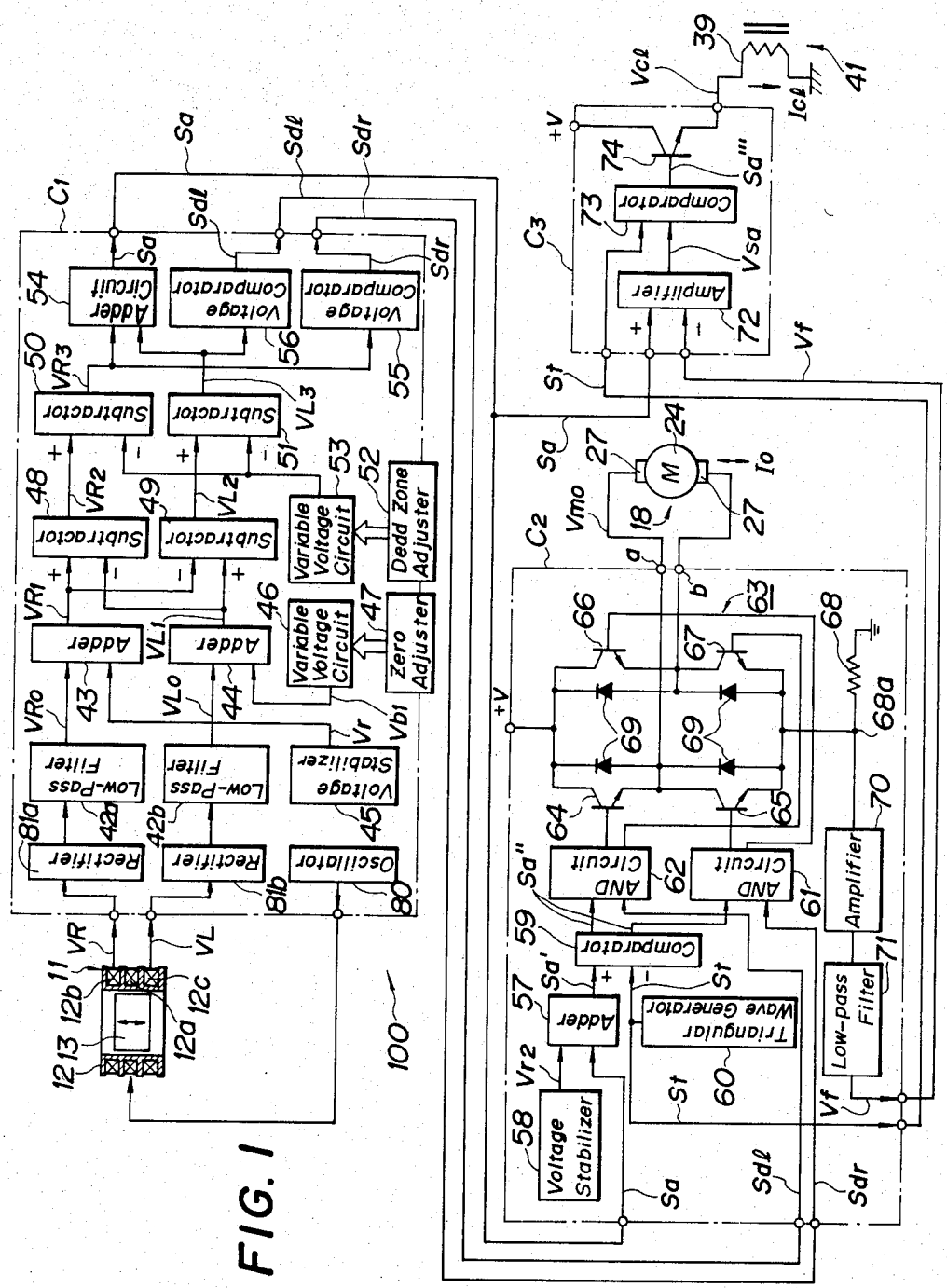
FIG. 1 is a block diagram of a driving control circuit of an electromagnetic servo device according to a preferred embodiment of the present invention, as it is applied to an electric power steering system for vehicles.

With reference to FIG. 1, designated at reference numeral 100 is the entirety of a driving control circuit of an electromagnetic servo device for electric power steering systems for vehicles according to a preferred embodiment of the present invention. In FIGS. 2A to 2D are shown characteristic curves of some of later-described signals to be output from essential circuit elements of the driving control circuit 100 while the electromagnetic servo device is put in service. In FIGS. 3 and 4A to 4C are given sectional views of the whole and an essential part, respectively, of an electromagnetic servo unit 200 constituting the electromagnetic servo device, the servo unit 200 being controlled by the driving control circuit 100, which unit 200 has been originally developed by the present applicant and is of a structure mechanically analogous to that disclosed in the aforesaid Japanese Patent Application No. 59-192390.

For the aid of comprehension, there will be first described the mechanical structure of the electromagnetic servo unit 200 with reference to FIGS. 3 and 4A to 4C, before entering description of the constitution as well as function of the driving control circuit 100.

Figure 3:
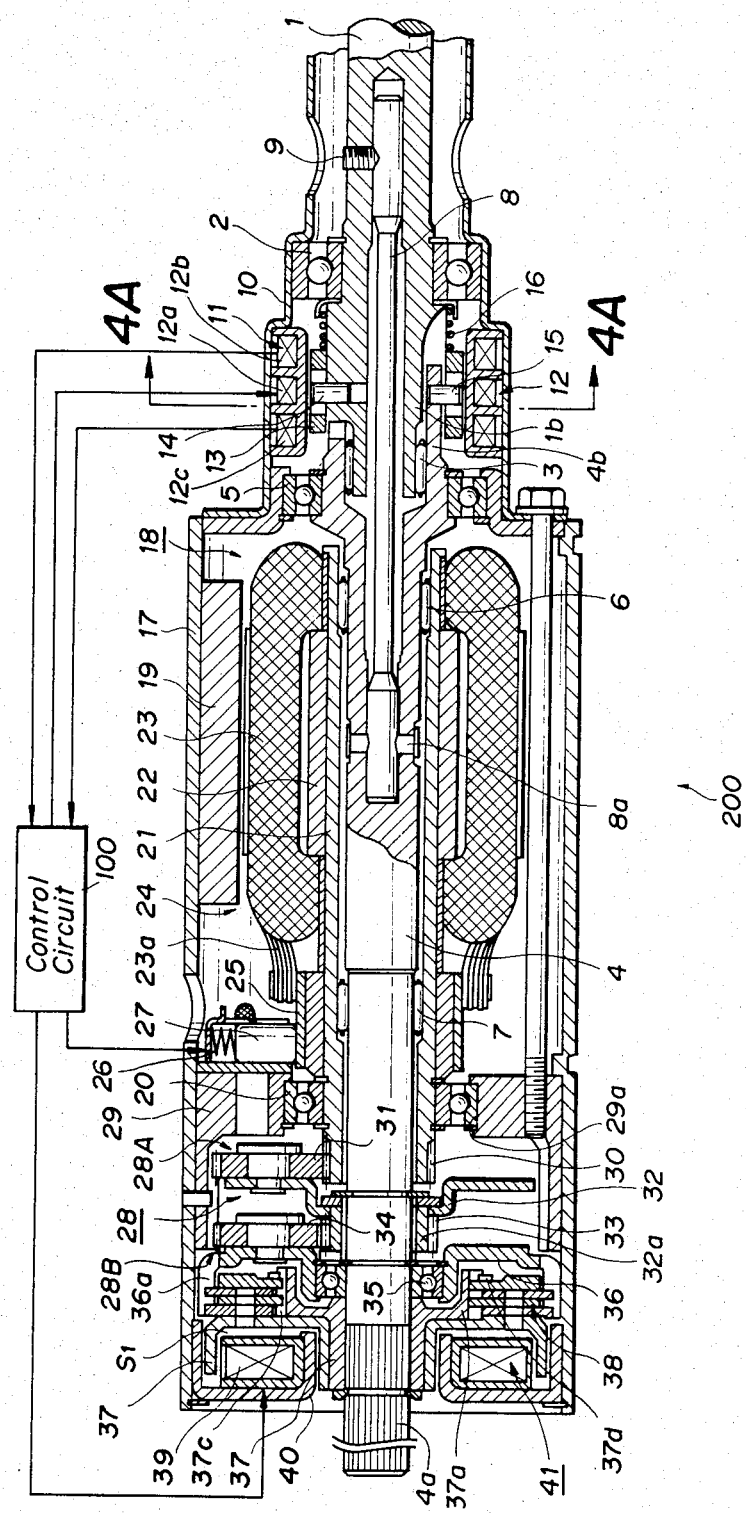
FIG. 3 is a longitudinal sectional view of the electromagnetic servo device which is controlled with the driving control circuit of FIG. 1.

Shown in FIG. 3 is the sectional view as described, and more particularly, a quarter cutaway longitudinal sectional view of the electromagnetic servo unit 200.

The servo unit 200 is now supposed to be equipped in an unshown electric power steering system of an unshown automotive vehicle.

The servo unit 200 includes an input shaft 1 rotatably supported by a ball bearing 2 as well as by a needle bearing and connected at the axially outer end thereof to a steering wheel (not shown) of the power steering system, and an output shaft 4 arranged coaxial with the input shaft 1 and interconnected by a torsion bar 8 with the input shaft 1. Also the output shaft 4 is rotatably supported by a ball bearing 5 and needle bearings 6, 7. The output shaft 4 has at the axially outer end thereof a splined portion 4a operatively assembled into a steering gearbox (not shown) of the power steering system.

As later detailed, a uniquely formed axially inner end portion 1b of the input shaft 1 is engaged at the innermost end thereof into a uniquely formed axially inner end portion 4b of the output shaft 4, where it is rotatably supported with the needle bearing 3 interposed therebetween.

The torsion bar 8 is fixed at one end thereof to the output shaft 4 by means of a pin 8a. The other end of the torsion bar 8 has fixed thereto, by means of a screw 9, the input shaft 1 which is thereby adapted to have, while no steering torque is acting thereon, a predetermined angular position about the axis thereof relative to the output shaft 4. In other words, when fixing the torsion bar 8 to the input shaft 1 by using the screw 9, the input shaft 1 is set to have a predetermined intermediate or neutral angular position relative to the output shaft 4.

In the foregoing arrangement, steering torque from the steering wheel is applied to the input shaft 1, and transmitted therefrom through the torsion bar 8 to the output shaft, causing torsional deformations in the torsion bar 8.

Incidentally, in FIG. 3, designated at reference numeral 10 is a steering column surrounding to accommodate therein the input shaft 1.

The servo unit 200 has, at an axial position thereof where the inner end portion 1b of the input shaft 1 is engaged into the inner end portion 4b of the output shaft 4, a torque detection mechanism 11 arranged so as to extend therearound and adapted for detecting torque acting on the input shaft 1 as differential torque between torque developed at the input shaft 1 and torque developed at the output shaft 4. The detection mechanism 11 includes a differential transformer 12 fixed to the inner circumference of the steering column 10 and a tubular mobile member 13 as an iron core axially slidably fitted around the mutually engaged end portions 1b, 4b of the input and output shafts 1, 4. The differential transformer 12 has a primary winding 12a excitable with an alternating current signal fed from the driving control circuit 100, and a pair of secondary windings 12b, 12c provided with output terminals connected to the driving control circuit 100, to thereby detect steering torque acting on the input shaft 1 as the differential torque between the input and output shafts 1, 4. The driving control circuit 100 has a control function of determining the quantity and the direction of conduction of an armature current Io (FIG. 1) to be fed to a later described electric motor 18, in accordance with the magnitude and acting direction of the steering torque.

As shown in FIG. 4A, the mobile member 13 is engaged with the input shaft 1 by means of a pair of radial pins 14, 14 fixed to the input shaft 1, and with the output shaft 4 by means of another pair of radial pins 15, 15 fixed to the output shaft 4, the radial pins 15, 15 being each respectively angularly spaced apart at 90° from one of the radial pins 14, 14, so that the pins 14, 15 are disposed at quarter points in the circumferential direction. For the engagement with the radial pins 14, 14 projecting from the input shaft 4, the mobile meber 13 has a pair of engagement holes 13a formed therethrough at corresponding angular positions so as to elongate in the axial direction of the torsion bar 8. Also for the engagement with the radial pins 15, 15 projecting from the output shaft 4, the mobile member 13 is formed therethrough with a pair of engagement holes 13b which elongate at a skewed angle with respect to the axial direction of the torsion bar 8. The mobile member 13 is normally biassed in the axial direction, to the left in FIG. 3, with a coil spring 16 compressed to be interposed between this member 13 and the aforesaid ball bearing 2.

In the foregoing arrangement, between each of the radial pins 15 and corresponding one of the elongate hole 13b is given a clearance due to the precision of workmanship. However, at one side 13c or the working side of the hole 13b, any play due to such clearance between the pin 15 and the hole 13b is substantially eliminated by the presence of the spring 16 that normally urges the pin 15 into abutment with the working side 13c, while the other side 13d of the hole 13 has a corresponding play 1 left against the pin 15.

According to the foregoing arrangement, when the input shaft 1 is forced to rotate by steering torque applied to the steering wheel, thus transmitting torque through the torsion bar 8 to the output shaft 4, there is developed a phase difference or relative angular displacement between the input and output shafts 1, 4, causing the mobile member 13 to axially move, to the right or left in FIG. 3, in accordance with the sign and absolute value of the phase difference, that is, the direction and magnitude of the relative angular displacement.

In this respect, under the condition that no steering torque is applied to be transmitted to the input shaft 1, the mobile member 13 is set to be kept at a predetermined axial position on the input shaft 1, where the radial pins 14, 15 are located at the longitudinally central parts of the elongate holes 13a, 13b of the member 13, respectively. Accordingly, when steering torque is applied, the resulted axial displacement of the mobile member 13 is correspondent in the direction and proportional in the magnitude to the differential torque that is then so developed between the input and output shafts 1, 4 as to act on the input shaft 1. For example, in FIG. 3, when the input shaft 1 as viewed from the right is forced to rotate clockwise relative to the output shaft 4, the mobile member 13 is caused to axially move to the right or toward the observer, or in other words, it is then caused to move upwardly in FIG. 4B. The differential transformer 12 is adapted to detect such differential torque, by potentiometrically measuring the axial displacement of the mobile member 13.

As shown in FIG. 3, the servo unit 200 includes a cylindrical casing 17 accommodating therein the aforesaid electric motor 18 coaxially arranged around the output shaft 4. The electric motor 18 is constituted as a direct current motor with a pair of permanent magnets 19 as a field fixed to the inner circumference of the casing 17, and a rotor 24 as an armature consisting of a tubular shaft 21 which is rotatably supported by the needle bearings 6, 7 and a ball bearing 20, and an armature core 22 which is fixed on the tubular shaft 21 and provided with an armature winding 23 arranged so as to cut, when rotated, those lines of magnetic flux developed by the magnets 19. Further, the rotor 24 is provided at the left end thereof with a slip ring commutator 25, to which the armature winding 23 has terminals 23a thereof connected in such a manner as to permit the armature current Io of necessary quantity to be sent therethrough in either direction of conduction as required. At each of necessary electrical angular positions, a brush 27 is brough into abutment with the slip ring commutator 25, while being normally urged thereagainst with a coil spring 26. Through the brush 27, the armature current Io as controlled is sent from the driving control circuit 100 into the armature winding 23.

In the foregoing arrangement, with torque applied from the steering wheel to the input shaft 1, while the input and output shafts 1, 4 have differential torque developed therebetween to be detected by the torque detection mechanism 11, the driving control circuit 100 is caused to function to send the armature current Io to the armature winding 23, thereby driving the electric motor 18, such that the rotor 24 rotates about the output shaft 4, independently thereof, in the same rotating direction as the input shaft 1.

Incidentally, as shown in FIG. 3, the ball bearing 20 rotatably supporting the left part of the tubular shaft 21 of the rotor 24 is fitted in a right opening 29a of a cylindrical ring gear 29 fixed to the inner circumference of the casing 17, which gear 29 is employed as a common ring gear for primary and secondary planetary gearings 28A, 28B constituting a speed reducing mechanism 28 through which the rotation of the rotor 24 is transmitted to the output shaft 4.

In the speed reducing mechanism 28 constituted with the two stages 28A, 28B of planetary gear, the primary stage 28A consists of a sun gear 30 formed along the outer circumference of the left end part of the tubular shaft 21, the aforesaid ring gear 29, and a triple of planet gears 31 interengaged between the sun and ring gears 30, 29, which planet gears 31 are pivotally attached to a disc-like flanged portion of a first carrier member 32. On the other hand, the secondary stage 28B consists of a sun gear 33 formed along the outer circumference of a tubular shaft 32a integrally joined with the carrier member 32, an axial extension of the ring gear 29, and a triple of planet gears 34 interengaged between the sun and ring gears 33, 29. The planet gears 34 are pivotally attached to a disc-like flanged portion of a second carrier member 36 which is rotatably disposed around the output shaft 4, with a bearing 35 interposed therebetween. The second carrier member 36 has formed, on the peripheral part of the flanged portion thereof, a triple of projections 36a axially projecting therefrom to the left in FIG. 3.

Moreover, as shown in FIG. 3, at the left of the second carrier member 36, the output shaft 4 has fixed thereon a tubular member 37 axially non-slidably splinefitted on the splined portion 4a of the shaft 4, which member 37 is radially outwardly stepped at the axially intermediate part thereof to have an annular portion 37a radially opposed to, at the inward side of, the axial projections 36a of the carrier member 36, the annular portion 37a extending by a predetermined length in the axial direction of the shaft 4. The tubular member 37 is provided with an annular element 37b fitted thereon, the element 37b having a channel-like cross section radially extending so long as it almost contacts with the inner circumference of the casing 17, while defining an annular space $S_1$ at the left side thereof in FIG. 3.

The annular portion 37a of the tubular member 37 has formed on the outer circumference thereof a triple of small radial projections 37c angularly spaced apart at equal intervals. Between the annular portion 37a and the axial projections 36a of the carrier member 36, there are interposed four annular clutch plates 38 overlapped to be arranged in a layered manner in the axial direction of the output shaft 4. Of the four clutch plates 38 as numbered from the left in FIG. 3, the first and third ones are engaged with the axial projections 36a of the carrier member 36 in an axially slidable and relatively non-rotatable manner, and the second and fourth ones, with the radial projections 37c of the annular portion 37a of the tubular member 37 in like manner. In this respect, the fourth one of the clutch plates 38 is restricted in the rightward movement in FIG. 3, with a stopper ring 37d fixed on the right end part of the annular portion 37a, and each of the clutch plates 38 has an axially slidable range thereof limited to be very small.

Further, in the left aperture of the casing 17, the servo unit 200 has a coil case 40 made of a magnetic material, the coil case 40 accommodating therein an exciting coil 39 to be disposed in the annular space $S_1$ defined by the annular element 37b fixed on the tubular member 37, which coil 39 is connected to a later described clutch driving circuit C3 (FIG. 1). Incidentally, the axial projections 36a, the clutch plates 38, the annular element 37b, and the tubular member 37 are adapted to cooperate together to constitute, with the exciting coil 39, an electromagnetic clutch 41.

In the foregoing arrangement including the electric motor 18, the primary and the secondary planetary gearings 28A, 28B, and the electromagnetic clutch 41, the rotation of the rotor 24 of the motor 18 is transmitted, while being speed-reduced through the gearings 28A, 28B, to the output shaft 4 in accordance with later-described actions of the clutch 41.

The electromagnetic clutch 41, which includes the exciting coil 39 and the clutch plates 38 as described, is adpated such that, while the coil 39 is energized with an exciting current Icl (FIG. 1) fed thereto, it is kept in a clutching state thereof in which the clutch plates 38 are frictionally engaged with each other to have a clutching force developed to a degree proportional to the quantity of the exciting current Icl.

According to the foregoing arrangement, while steering torque is acting on the input shaft 1, the torsion bar 8 is twisted, depending on the magnitude of a load to be born by the output shaft 4, thus developing a corresponding angular displacement of the input shaft 1 relative to the output shaft 4, which displacement is detected with the torque detection mechanism 11 including the differential transformer 12. In the transformer 12, the mobile member 13 is axially displaced in accordance with the relative angular displacement between the input and output shafts 1, 4, thereby generating a set of later-described detection signals to be sent to the driving control circuit 100. At the circuit 100, the detection signals are processed to be utilized to feed the electric motor 18 with the armature current Io as necessary and the electromagnetic clutch 41 with the exciting current Icl as necessary, whereby the motor 18 is driven to ratate, producing necessary auxiliary torque to be transmitted through the speed reducing mechanism 28, and concurrently the clutch 41 is driven to serve for the transmission of auxiliary torque from the mechanism 28 to the output shaft 4. As a result, at the shaft 4, adequately magnified torque is developed to be output.

Incidentally, as shown in FIG. 4A, the axially inner end portion 1b of the input shaft 1 is radially cut to provide a pair of arcuate recesses having at circumferentially opposed ends thereof radial side faces 1c, respectively, and on the other hand the axially inner end portion 4b of the output shaft 4 is shaped into a pair of arcute pieces to be loose-fitted in the arcuate recesses of the input shaft 1 respectively in a relatively rotatable manner about the axis of the torsion bar 8, the arcuate pieces also having at circumferentially opposed ends thereof radial side faces 4c, respectively. It thus will be understood that, while the input shaft 1 is applied with steering torque, the relative angular displacement between the input and output shafts 1, 4 becomes large with increase in the magnitude of load to be born by the output shaft 4, but does not exceed a predetermined phase difference (approx. 10° in this embodiment as shown in FIG. 4A) therebetween, even when such load is caused to enlarge beyond a predetermined limit value corresponding to this phase difference, since the radial side faces 1c of the input shaft 1 are brought into abutment with the radial side faces 4c of the output shaft 4, respectively, when the relative angular displacement is developed to the aforesaid phase difference. This further means that the range of axial displacement of the mobile member 13, that is, the range of movement thereof to the right and left in FIG. 3, has preset limits, so that, when the member 13 is displaced to either of such limits, corresponding one of the secondary windings 12b, 12c of the differential transformer 12 outputs a voltage signal of a highest level, while the signal value thereof is unable to be further enlarged. In other words, with such restrictive engagement between the input and output shafts 1, 4, the electromagnetic servo unit 200 has built therein a fail-safe mechanism.

There will be described below the constitution as well as the function of the driving control circuit 100 adapted to control actions of the electromagnetic servo unit 200.

Referring now to FIG. 1 showing a block diagram of the control circuit 100, the differential transformer 12 has the primary winding 12a fed with an alternating electric current signal of a predetermined frequency from an oscillator 80, and the secondary windings 12b, 12c adapted to output as the aforementioned detection signals therefrom a pair of voltage signals VR, VL responsible either VR for torque clockwise acting on the input shaft 1 and the other VL for torque counterclockwise acting thereon. The output signals VR, VL are first rectified through a pair of rectifiers 81a, 81b and smoothed by a pair of low-pass filters 42a, 42b, to be supplied as a pair of direct-current voltage signals VRo, VLo to a pair of adders 43, 44, respectively.

At one 43 of the adders 43, 44, the voltage of the signal VRo supplied through a signal line at the side of the secondary winding 12b is added to that of a constant voltage signal Vr supplied from a voltage stabilizer 45. On the other hand, at the other 44 of the adders 43, 44, the voltage of the signal VLo supplied through a signal line at the side of the secondary winding 12c is added to that of a voltage signal Vb1 supplied from a variable-voltage circuit 46 which is controlled with a zero adjuster 47 for setting the voltage of the signal Vb1.

Incidentally, in the foregoing arrangement, when the mobile member 13 is caused to displace up and down in FIG. 1, also the voltage signals VRo, VLo supplied to the adders 43, 44 through the signal lines at the respective sides of the secondary windings 12b, 12c differentially vary in accordance with the displacement of the member 13. When the mobile member 13 is put in the neutral position, however, those signals VRo, VLo are even in the voltage level.

More particularly, the differential transformer 12 is connected such that, when the mobile member 13 is caused to move upwardly in FIG. 1 with the input shaft 1 clockwise rotated relative to the output shaft 4, the voltage of the signal VRo rises and that of the signal VLo falls in proportion to the upward displacement of the member 13, and to the contrary, when the member 13 is caused to downwardly move in FIG. 1 with the input shaft 1 counterclockwise rotated relative to the output shaft 4, the former VRo falls and the latter VLo rises in proportion to the downward displacement thereof.

In this respect, practically, due to various causes such as unavoidable fine dimensional errors in the assembly work of the differential transformer 12, the voltages of the signals VRo, VLo from the signal lines at the respective sides of the secondary windings 12b, 12c may well have a difference left therebetween even when the mobile member 13 is put in the neutral position. To cope with such state, the adders 43, 44, the voltage stabilizer 45, the variable voltage circuit 46, and the zero adjuster 47 are connected to be combined as described, whereby the adders 43, 44 are permitted to have output therefrom a pair of voltage signals VR1, VL1 adjusted at an even voltage when the mobile member 13 is put in the neutral position.

The voltage signals VR1, VL1 output from the adders 43, 44 are input to a pair of subtractors 48, 49, respectively.

The subtractors 48, 49 are adapted to ouput a pair of voltage signals VR2, VL2, respectively, such that VR2=Ai(VR1−VL1) and VL2=Ai(VL1−VR1), where Ai is an amplification factor.

In the control circuit 100, in which a single power supply (not shown) of positive polarity is used, even under such a condition that VR1<VL1 for example, the signal VR2 output from the subtractor 48 has a voltage thereof kept from becoming negative, whereas under such condition it substantially approaches zero at the positive side. Such characteristic is analogous to the voltage signal VL2 of the subtractor 49, as well.

In the foregoing circuit arrangement, under the condition that the input shaft 1 has no steering torque applied thereto, the mobile member 13 is located at the neutral position, so that the voltages of the signals VR1, VL1 output from the adders 43, 44 are equalized to each other and hence those of the output signals VR2, VL2 from the subtractors 48, 49 are both rendered substantially zero.

In this respect, under the condition without steering torque applied to the input shaft 1, even if the level equalization between the voltage signals VRo, VLo is ideally effected by the combination of the circuit elements 43 to 47 to thereby adjust the output signals VR1, VL1 of the adders 43, 44, such that VR1=VL1, there practically is still left the possibility that these signals VR1, VL1 may not be yet properly zero-adjusted, that is, VR1=VL1=k>0 (zero), for reasons such as errors attendant on the assembly work of the differential transformer 12. Such failure of zero adjustment, if left as it is, might constitute an inadequacy in subsequent processes. In this embodiment, however, such fear is successfully eliminated by the provision of the subtractors 48, 49.

The output signals VR2, VL2 of the subtractors 48, 49 are input to positive terminals of another pair of subtractors 50, 51, respectively, while each of these subtractors 50, 51 has further input to a negative terminal thereof a bias signal Vb2 as a voltage output from a variable voltage circuit 53 which is controlled with a dead zone adjuster 52 for setting the voltage of the signal Vb2. In these subtractors 50, 51, the voltage of the signal Vb2 is subtracted, at the side of the subtractor 50, from that of the signal VR2 and, at the side of the subtractor 51, from that of the signal VL2, whereby the subtractors 50, 51 have produced therein to be output therefrom a pair of voltages signals VR3, VL3, respectively, which signals VR3, VL3 are thus lower in the potential level by a quantity of the signal Vb2 than the signals VR2, VL2, respectively, and hence those VR3, VL3 are rendered wider in the width of dead zone than these VR2, VL2.

The voltage signals VR3, VL3 thus obtained are fed both to an adder circuit 54, where they are logically added to obtain a torque magnitude signal Sa, and each respectively to one of a pair of voltage comparator 55, 56, where it is compared with a reference voltage or reference voltages to obtain, at the side of comparator 55 fed with the signal VR3, a torque direction signal Sdr responsible for torque clockwise acting on the input shaft 1 and, at the side of comparator 56 fed with the signal VL3, a torque direction signal Sdl responsible for torque counterclockwise acting thereon.

FIG. 2A includes output characteristic curves of the torque magnitude and the torque direction signals Sa and Sdr, Sdl. In FIG. 2, the axis of abscissa represents steering torque Ti acting on the input shaft 1 and that of ordinate represents the voltage of various signals. The torque magnitude signal Sa to be outut from the adder circuit 54 is given as the logical sum of the output signals VR3, VL3 of the subtractors 50, 51, and has a dead zone D1 thereof preset by the dead zone adjuster 52. On the other hand, the torque direction signals Sdr to be output from the comparator 55, as well as the torque direction signal Sdl from the comparator 56, is given as a logical voltage signal that steps up to and remains at a "high" level, when the voltage of the signal VR3 (VR2 for Sdl) has become and is kept higher than a predetermined value, and steps down to and remains at a "low" level, when this voltage has become and is kept lower than same or another predetermined value.

The torque magnitude signal Sa is a direct current voltage signal correspondent to the magnitude of the steering torque Ti acting on the input shaft 1, and utilized as a signal for controlling the quantity of the armature current Io to be fed to the electric motor 18. The torque magnitude signal Sa has an upper limit thereof at a voltage level Vc corresponding to a point where the relative angular displacement between the input and output shafts 1, 4 is developed to the predetermined phase difference, putting in service the fail-safe mechanism consisting of the respective axially inner end portions 1b, 4b of the shafts 1, 4.

The torque direction signals Sdr, Sdl are employed as a pair of signals representing the acting direction of the steering torque Ti to the input shaft 1. Exemplarily, when turned to the "high" level, the torque direction signal Sdr implies that the input shaft 1 as viewed from the side of the steering wheel is rotated to the right or in the clockwise direction thereof relative to the output shaft 4. To the contrary, when turned to the "high" level, the torque direction signal Sdl implies that the input shaft 1 is rotated to the left or in the counterclockwise direction thereof relative to the output shaft 4. As will be described later, the direction of rotation of the electric motor 18 is determined in correspondence to the torque direction signals Sdr, Sdl.

In the driving control circuit 100, those circuit elements which has been described hitherto constitute a torque detection circuit C1, in which therefore the output signals VR, VL from the torque detection mechanism 11 including the differential transformer 12 are processed to obtain the torque magnitude and the torque directions signals Sa and Sdr, Sdl to be output. The torque magnitude signal Sa as output from the circuit C1 is fed to a motor driving circuit C2 and to a clutch driving circuit C3, while the torque magnitude signals Sdr, Sdl from the circuit C1 are fed only to the motor driving circuit C2.

Hereinbelow, description will be made of the motor driving circuit C2, with reference again to FIG. 1.

The torque magnitude signal Sa from the torque detection circuit C1 is input to an adder 57, where the voltage level of the signal Sa is raised by adding a constant voltage Vr2 output from a voltage stabilizer 58. As a result, the adder 57 has such a voltage signal Sa′ output therefrom that is representable by a characteristic curve marked with Sa in FIG. 2B. By the addition of the constant voltage Vr2 to the torque magnitude signal Sa, the resulted voltage signal Sa' is adapted to be utilized, even when driving to start the electric motor 18, to have the motor 18 rotate at a later-described constant motor number or motor speed Nk.

The output signal Sa' from the adder 57 is input to a positive terminal of a comparator 59, where it is compared with a voltage signal St of a triangular waveform input from a triangular wave generator 60 to a negative terminal of the comparator 59. The comparison between the signals Sa' and St is made of signal voltages thereof, whereby the comparator has produced therein a voltage pulse signal Sa" of a rectangular waveform to be output therefrom at a source voltage level for each duration of time in which the voltage of the signal Sa' from the adder 57 is higher than that of the triangular wave signal St. As exemplarily shown in FIGS. 2C and 2D, the pulse signal Sa" output from the comparator 59 is given as a pulse train consisting of a rectangular wave of a constant amplitude Vcc, the rectangular wave occurring at the same repetition frequency as the triangular wave of the signal St and having a pulse width such as of duration W1 (FIG. 2C) or W2 (FIG. 2D) proportional to the voltage of the output signal Sa' of the adder 57. Like this, the triangular wave generator 60 is adapted to cooperate with the comparator 59 to provide the pulse signal Sa" having a pulse width Wi (where the suffix "i" represents a general case and may exemplarily be an arbitrary integer such as 1 or 2) thereof varied depending on the steering torque Ti acting on the input shaft 1.

The pulse signal Sa" of the comparator 59 is output to an input terminal of an AND circuit 61 receiving at another input terminal thereof the torque direction signal Sdr, and to an input terminal of another AND circuit 62 receiving at another input terminal thereof the torque direction signal Sdl.

Incidentally, the motor driving circuit C2 further includes a switching bridge circuit 63 for controlling the quantity and the direction of conduction of the armature current Io to be fed to the electric motor 18, the bridge circuit 63 having four bridge sides consisting of four npn transistors 64, 65, 66, 67. The bridge circuit 63 is connected, at an upstream terminal +V thereof between the bridge sides of transistors 64, 66, to a power supply (not shown) and, at a downstream terminal 68a between the bridge sides of transistors 65, 67, through a resistor 68 to the ground, and has, between the bridge sides of transistors 64, 65 and between the bridge sides of transistors 66, 67, output terminals a and b thereof connected to the brushes 27, 27 of the electric motor 18, respectively, while including four diodes 69 each respectively installed between a collector and an emitter of, thus being connected to the bridge side of, one of the four transistors 64 to 67, in parallel therewith, to thereby prevent the reverse flow of electric current which otherwise would occur accompanying on-off actions of the transistors 64 to 67.

The aforementioned AND circuits 61, 62 are connected, at the output side of 61, to respective bases of the transistors 65, 66 and, at the output side of 62, to respective bases of the transistors 64, 67.

In the foregoing circuit arrangement, exemplarily, when the torque direction signal Sdr is turned to the "high" level, the AND circuit 61 is brought into an open state thereof in which the pulse signal Sa" from the comparator 59 is passed to the bases of the transistors 65, 66, of which on-off actions are thereby controlled to apply a necessary voltage Vmo across the electric motor 18, to send thereto the armature current Io of magnitude or quantity corresponding to the magnitude of the steering torque Ti acting on the input shaft 1, in either direction of conduction thereof that causes the motor 18 to rotate in accordance with the acting direction of the steering torque Ti to the input shaft 1. To the contrary, when the torque direction signal Sdl is turned to the "high" level, the AND circuit 62 is brought into an open state thereof in which the pulse signal Sa" from the comparator 59 is passed to the bases of the transistors 64, 67, of which on-off actions are thereby controlled to drive the electric motor 18 in a manner similar to that described above.

In the above-described circuit function, the voltage Vmo applied across the electric motor 18 is controlled by the output signal Sa" of the comparator 59, in correspondence to the magnitude of the steering torque Ti acting on the input shaft 1, so that the number N of revolutions of the motor 18 is kept substantially constant in a high speed rotation state irrespective of possible variations in the armature current Io.

In this respect, when the direct-current electric motor 18 is controlled to be driven to rotate with the torque magnitude signal Sa and the torque direction signals Sdr, Sdl, the motor number or speed N is kept substantially constant for the following reason.

For the explanation of this reason, it is now supposed that the electromagnetic servo unit 200 is in a certain state thereof in which the steering torque Ti acting on the input shaft 1 is of a certain magnitude having a tendency to produce clockwise rotation, so that the torque direction signal Sdr is turned to the "high" level.

Moreover, for the comprehension purpose, it is advised that, as will be seen from FIGS. 2C and 2D, the pulse signal Sa" output from the comparator 59 has an average voltage Vm1, such that Vm1=Vcc (Wi/Wo), where Wo is the pulse repetition period of the signal Sa" and equals to that the triangular wave signal St. The average voltage Vm1 of the pulse signal Sa" is in proportion to the on-time voltage of the output signal Sa' from the adder 57 shown in FIG. 2B. The AND circuits 61, 62 are adapted to cooperate with the bridge circuit 63 to determine the polarity of the electric motor 18, when applying thereacross the average voltage Vm1 as converted into the voltage Vmo, that is, to determine the direction of conduction of the armature current Io to be sent in accordance with the voltage Vm1 or Vmo.

Now, since the torque direction signal Sdr is at the "high" level, the average voltage Vm1 is applied through the AND circuit 61 to the bases of the transistors 65, 66, thus applying corresponding voltage Vmo across the electric motor 18, whereby the armature current Io is conducted from the power supply through the terminal +V, the transistor 66, the terminal b, the motor 18, the terminal, the transistor 65, and the terminal 68a to ground.

Figure 5:
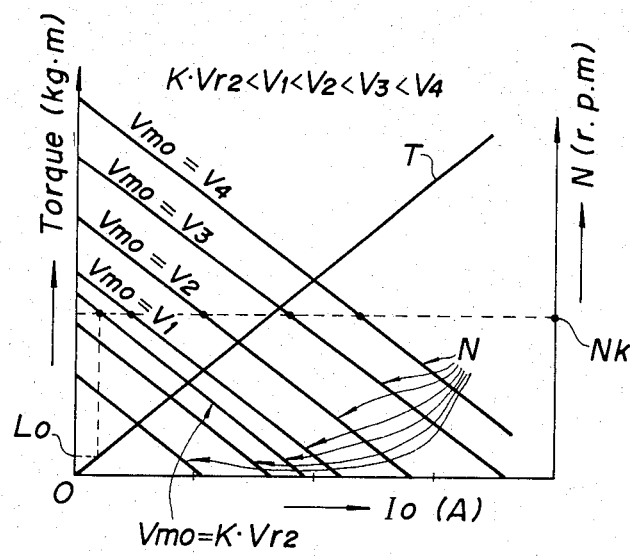
FIG. 5 is a graph showing characteristic curves of an electric motor of the electromagnetic servo device.

Incidentally, in the direct-current motor 18, if the voltage Vmo applied thereacross is constant, the motor number or speed N decreases and the armature current Io increases in proportion to increase in the magnitude of torque T acting as a load on the motor 18. On the other hand, in the case where the magnitude of the load torque T is constant, the motor number or speed N increases in proportion to increase in the voltage Vmo, while the armature current Io is kept constant, as will be understood from FIG. 5 showing characteristic curves of the motor 18.

Now, therefore, by increasing the voltage Vmo applied across the electric motor 18 proportionally to increase in the load torque T acting on the motor 18, the motor 18 can be constantly rotated at the desired motor number or motor speed Nk.

In this respect, it should be noted that, even while the voltage Vmo across the electric motor 18 is being varied in such a manner as just described, the armature current Io increases in proportion to increase in the load torque T acting on the motor 18.

In the electromagnetic servo unit 200 according to this embodiment, however, at the time when the electric motor 18 is driven to start rotation, the input shaft 1 has such torque T1 acting thereon that corresponds to the boundary of the dead zone D1 (see FIGS. 2A and 2B). Therefore, in the servo unit 200, the electric motor 18 is to be driven to rotate at the motor number or motor speed Nk, under the presence of such torque T1, when a voltage Vmo corresponding to the predetermined voltage Vr2 is applied across the motor 18, while Vmo=k·Vr2, where k is a circuit constant.

It will be comprehended that the motor number or motor speed Nk is determined from the voltage k·Vr2 across the electric motor 18 and such a load Lo (FIG. 5) that is imposed on the motor 18 when the aforesaid torque T1 is acting on the input shaft 1. On the other hand, the load torque T acting on the electric motor 18 is correspondent to the steering torque Ti acting on the input shaft 1, while the electromagnetic clutch 41 is interposed therebetween. In this respect, it is here informed that the clutching degree of the electromagnetic clutch 41 is controlled to be basically in proportion to the voltage of the torque magnitude signal Sa, as will be detailed later.

As will be understood from the foregoing explanation as well as from the characteristic curve of Sa' of FIG. 2B, the voltage Vmo applied across the electric motor 18 is increased in proportion to increase in the magnitude of the load torque T acting on the motor 18, so that the motor number or speed N of the motor 18 is held substantially at the aforesaid motor number or motor speed Nk when the motor 18 is driven to rotate. Further, when the electric motor 18 is thus driven to rotate, the quantity of the armature current Io is put in a proportional relation to the magnitude of the load torque T acting on the motor 18, notwithstanding the value of the voltage Vmo, provided that Vmo>0.

Referring again to FIG. 1, in the motor driving circuit C2, the quantity of the armature current Io fed to the electric motor 18 is detected as a voltage across the resistor 68, which voltage is fed as a feed-back signal Vf through an amplifier 70 and a low-pass filter 71 to the clutch driving circuit C3. Moreover, also the triangular wave signal St given by the triangular wave generator 60 is fed to the clutch driving circuit C3.

Hereinbelow, the description will be made of the clutch driving circuit C3, with reference still to FIG. 1.

In the clutch driving circuit C3, a differential amplifier 72 has fed to a positive input terminal thereof the torque magnitude signal Sa sent from the OR circuit 54 of the torque detection circuit C1 and, to a negative input terminal thereof, the feed-back signal Vf taken as voltage across the resistor 68 of the motor driving circuit C2, which voltage is in proportion to the quantity of the armature current Io. As a result, there is obtained an amplified voltage signal Vsa of an amplitude proportional to the voltage difference between the signals Sa and Vf.

The voltage signal Vsa of the amplifier 72 is input together with the triangular wave signal St to a comparator 73, where they are compared to thereby produce a rectangular pulse signal Sa''' having a pulse width Wi thereof proportional to the voltage of the signal Vsa, that is, in proportion to the voltage difference between the torque magnitude signal Sa and the feed-back signal Vf corresponding to the armature current Io. The pulse signal Sa''' is output to a switching transistor 74, of which on-off action is thereby controlled to apply a voltage Vc1 across the exciting coil 39 of the electromagnetic clutch 41, thereby feeding the exciting current Ic1 to the coil 39 to drive the clutch 41.

The pulse signal Sa''' has an average voltage Vm2 thereof representable such that Vm2=Vcc (Wi'/Wo), like the average voltage Vm1 of the pulse signal Sa''.

The electromagnetic clutch 41 is adapted to have no direct-coupling states, even when the voltage of the torque magnitude signal Sa is raised up to the predetermined limit value Vc of FIG. 2A and hence the voltage Vc1 across the coil 39 has reached to a maximum level. As a result, when driven, the electromagnetic clutch 41 is always put in a semi-clutching state, while practically the clutching degree depends on the voltage Vc1 across the exciting coil 39.

In the foregoing arrangement, when the voltage Vc1 as an output voltage of the clutch driving circuit C3, that is, as an output signal from an emitter of the transistor 74, is desired to be simply dependent on the torque magnitude signal Sa, there may be employed a modification in which exemplarily an ouput signal of the transistor 74 is applied as a feed-back signal to the negative input terminal of the amplifier 72.

In such modification, however, the clutching degree of the electromagnetic clutch 41 is determined irrespective of actual quantity of the armature current Io, that is, without taking into account the load torque T acting on the electric motor 18, thus leaving the possibility of failure to achieve a well-matching state between the clutching degree of the clutch 41 and motor torque of the motor 18, that is, the load torque T acting thereon.

In this respect, in the driving control circuit 100, the feed-back signal Vf actually correspondent to the quantity of the armature current Io is fed to the negative input terminal of the differential amplifier 72, so that the occurrence of such failure of matching state is effectively prevented. It should be noted that the actual quantity of the armature current Io is correspondent to the magnitude of the load torque T acting on the electric motor 18, while the load torque T is actually acting thereon via the output shaft 4 and through the electromagnetic clutch 41 as well as the speed reducing mechanism 28.

Accordingly, in the electromagnetic servo system with such feed-back system, while exemplarily the voltage Vmo across the electric motor 18 is maintained at a certain level, if the motor number or speed N is caused to decrease for some reason, then the armature current Io increases, thus raising the voltage of the feed-back signal Vf. Since the voltage of the torque magnitude signal Sa is left unchanged as it is, that of the output signal Vsa from the amplifier 72 is made small, thus resulting in a lowering of the clutching degree of the clutch 41. It will be easily comprehended that, when the motor number or speed N of the electric motor 18 is caused to decrease, the transmission of motor torque to the output shaft 4 is smoothly achieved by reducing the clutching degree of the electromagnetic clutch 41.

To the contrary, while exemplarily the voltage Vc1 to be applied to the electromagnetic clutch 41 is maintained at a certain level, if the clutching degree of the clutch 41 is caused to lower for some reason such as a temperature change, the load torque T acting on the electric motor 18 becomes weak. Accordingly, the armature current Io of the motor 18 decreases, while the motor number or speed N thereof increases, thus causing a voltage drop of the feed-back signal Vf. Since the voltage of the torque magnitude signal Sa is kept unchanged, that of the output signal Vsa from the amplifier 72 is enlarged, thus resulting in an intensified clutching degree of the clutch 41. It will be easily comprehended that, also when the motor number or speed N of the electric motor 18 is caused to increase, the transmission of motor torque to the output shaft 4 is smoothly made by raising the clutching degree of the clutch 41.

As will be understood from the foregoing description, in the driving control circuit 100, by taking into account the steering torque Ti acting on the input shaft 1, the electric motor 18 is controlled to be constantly rotated at the motor number or motor speed Nk and concurrently the electromagnetic clutch 41 is controlled to be changed depending on the steering torque Ti. Moreover, as described, the feed-back signal Vf as a signal according to the actual quantity of the armature current Io is fed back to the torque magnitude signal Sa as a basic signal to produce the voltage Vc1 for driving the electromagnetic clutch 41, so that a matching state is always effectively achieved between the motor torque of the electric motor 18 and the clutching force of the clutch 41 even at occasional occurrences of variations in the motor number or speed N of the motor 18 and/or the clutching degree of the clutch 41.

Figure 6:
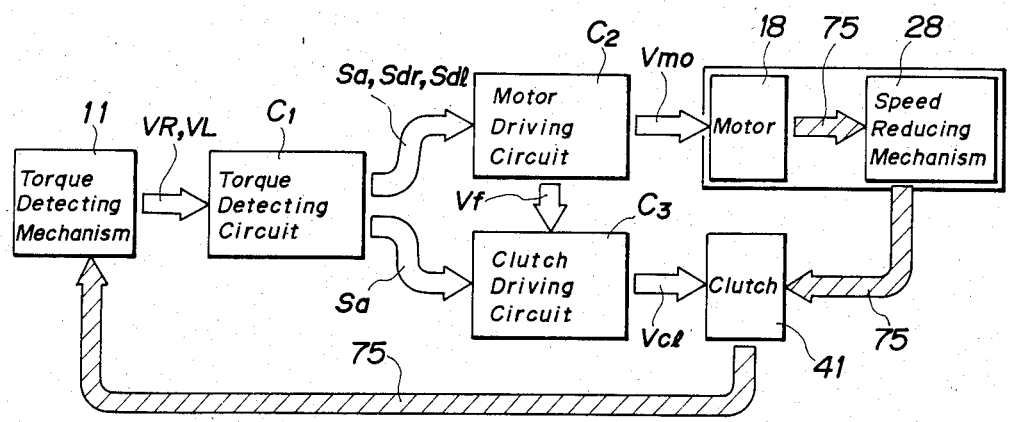
FIG. 6 is a flow chart describing functional relations among principal components of the entire electromagnetic servo device including the driving control circuit.

FIG. 6 is a schematic flow chart describing various functional relations such as of torque and signal flow in the entire system including the driving control circuit 100 and involved mechanical structures.

As shown in FIG. 6, the signals VR, VL as output from the torque detection mechanism 11 consisting of the differential transformer 12 and the mobile member 13 are input to the torque detection circuit C1, where they are processed in the described manner to obtain the torque magnitude signal Sa corresponding to the magnitude of input torque and the torque direction signals Sdr, Sdl responsible for identification of the acting direction of the input torque, which signals Sa and Sdr, Sdl are fed to the motor driving circuit C2, and the clutch driving circuit C3, as required. Between the motor driving circuit C2 and the clutch driving circuit C3, the signal Vf as a signal according to the armature current Io correspondent to torque developed at the electric motor 18 is fed from the circuit C2 to the circuit C3, to thereby control the clutching state of the clutch 41, in consideration of motor torque of the motor 18, so that the torque developed in the motor 18 is in accord with the torque to be transmitted through the clutch 41.

Incidentally, in FIG. 6, designated at reference numeral 75 is the flow of torque. When driven with a signal output from the motor driving circuit C2, the electric motor 18 has motor torque developed therein, which torque is transmitted through the speed reducing mechanism 28 and the electromagnetic clutch 41 to the output shaft 4, thus having a relative angular displacement developed between the input and output shafts 1, 4, thereby causing variations in the output signals VR, VL of the torque detection mechanism 11, so that a feed back system is consituted.

In the foregoing arrangement, the rotation of the electric motor 18 is made dependent on the detection signals VR, VL of the differential transformer 12, to thereby control the motor number or speed N of the motor 18 to be substantially constantly kept at the high-speed motor number or motor speed Nk. Moreover, for the prevention of torque variations due to low-speed rotation in the startup of the electric motor 18, the voltage stabilizer 58 is adapted to provide the signal Vr2 to be added to the torque magnitude signal Sa that is employed to control the quantity of the armature current Io. Further, the clutching degree of the multi-plated electromagnetic clutch 41 is controlled taking into account motor torque developed at the electric motor 18, so that, with a slip given by putting the clutch 41 in a semi-clutching state thereof, the difference between high-speed motor number or speed of the motor 18 and reduced motor number or speed of the output shaft 4 is permitted to be effectively absorbed, thereby achieving smooth and stable transmission of the motor torque to the output shaft 4.

As will be understood from the foregoing description of the preferred embodiment, the essential point of the present invention resides in that a signal Vf according to the quantity of an actual armature current Io conducted through an electric motor 18 is fed back to a signal Vc1 or Sa utilized for the driving control of an electromagnetic clutch 41. Accordingly, the present invention may advantageously be applied to an arbitrary type of electromagnetic servo device in which an electric motor as well as an electric clutch is controlled of the driving thereof taking into account the magnitude and the acting direction of torque acting on an input shaft.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:
1. In an electromagnetic servo device (200) including:
an input shaft (1);
an output shaft (4);
electric motor means (18) for producing auxiliary torque to be applied to said output shaft (4);
electromagnetic clutch means (41) for transmitting motor torque of said motor means (18) as the auxiliary torque to said output shaft (4);
torque detection means (11) for detecting steering torque (Ti) acting on said input shaft (1); and
driving control circuit means (100) adapted for, in accordance with an output signal (VR, VL) from said torque detection means (11), providing:
a first control signal (Vmo), to thereby feed an armature current (Io) of a controlled quantity in a controlled direction, to said motor means (18); and
a second control signal (Vc1), to thereby control, said clutch means (41),
an improvement comprising:
said second control signal (Vc1) having fed back thereto a signal (Vf) according to the actual quantity of said armature current (Io).

2. An electromagnetic servo device according to claim 1, wherein:
said driving control circuit means (100) is adapted to produce, in accordance with said output signal (VR, VL) from said torque detection means (11), a torque magnitude signal (Sa) representing the magnitude of the torque (Ti) acting on said input shaft (1) and a torque direction signal (Sdr, Sdl) representing the direction of same;
said first control signal (Vmo) comprises a voltage having a level thereof and a direction of application thereof determined in correspondence to said torque magnitude signal (Sa) and said torque direction signal (Sdr, Sdl), respectively; and
said second control signal (Vcl) is produced according to said torque magnitude signal (Sa),
so that, when driven, said electric motor means (18) rotates at a constant motor speed (Nk).

3. An electromagnetic servo device according to claim 2, wherein:
said electromagnetic clutch means (41) is adapted to operate in a semi-clutching manner, when driven.

4. An electromagnetic servo device according to claim 2, wherein:
said driving control circuit means (100) includes dead zone control means (50, 51, 52, 53) for controlling to adjust the width of a dead zone (D1) of said torque magnitude signal (Sa).

5. An electromagnetic servo device according to claim 4, wherein:
the level of said voltage of said first control signal (Vmo) is determined in accordance with a sum signal (Sa') resulted from an addition of a constant voltage signal (Vr2) to said torque magnitude signal (Sa); and
said constant motor speed (Nk) of said electric motor means (18) is determined from the magnitude of a load (Lo) to be imposed on said motor means (18) when the torque (T1) acting on said input shaft (1) is input with a magnitude corresponding to a preset width of said dead zone (D1), and the level (K·Vr2) of voltage that said first control signal (Vmo) has when said sum signal (Sa') is equal in the level to said constant voltage signal (Vr2).

* * * * *